United States Patent [19]

August et al.

[11] Patent Number: 5,671,267
[45] Date of Patent: Sep. 23, 1997

[54] INTERACTIVE SYSTEM FOR COMMUNICATIONS BETWEEN A CORDLESS TELEPHONE AND A REMOTELY OPERATED DEVICE

[75] Inventors: Katherine Grace August, Matawan; Charles David Caldwell, Cliffwood Beach; Anthony James Grewe, Holmdel; Steven M. Herbst, Bernardsville; Howard M. Singer, Marlboro; Theodore Sizer, II, Little Silver, all of N.J.

[73] Assignee: Lucent Technologies Inc., Murray Hill, N.J.

[21] Appl. No.: 367,409

[22] Filed: Dec. 30, 1994

[51] Int. Cl.⁶ .................................................. H04Q 7/32
[52] U.S. Cl. .................... 379/61; 379/110; 348/10
[58] Field of Search ....................... 379/58, 61, 110, 379/93, 96, 97, 98; 348/6, 7, 10, 14

[56] References Cited

U.S. PATENT DOCUMENTS

| | | | |
|---|---|---|---|
| 5,063,588 | 11/1991 | Patsiokas et al. | 379/57 |
| 5,128,987 | 7/1992 | McDonnough et al. | 379/110 |
| 5,138,649 | 8/1992 | Krisbergh et al. | 379/58 |
| 5,410,326 | 4/1995 | Goldstein | 348/7 |

*Primary Examiner*—Dwayne Bost
*Assistant Examiner*—William G. Trost
*Attorney, Agent, or Firm*—Samuel R. Williamson

[57] ABSTRACT

An interactive communication system includes a portable unit of a cordless telephone for providing wireless telephone communications and integrating telephone functions and control of remotely operated devices, such as television sets, video cassette recorders and cable converters. The portable unit advantageously provides controlling information to a remotely operated device in response to voice and data communications occurring over the telephone network.

23 Claims, 5 Drawing Sheets

INTERACTIVE SYSTEM FOR COMMUNICATIONS BETWEEN A CORDLESS TELEPHONE AND A REMOTELY OPERATED DEVICE

BACKGROUND OF THE INVENTION

1. Technical Field

This invention relates generally to cordless telephones and, more particularly, to a cordless telephone having a portable unit arranged for providing control functions for remotely operated devices.

2. Description of the Prior Art

Cordless telephones have now become as commonplace as corded telephones in many homes. The state of cordless telephone development is illustrated in a number of United States patents such as, for example, U.S. Pat. Nos. 4,731,814, 4,736,404 and 5,044,010. Similarly, remote control units for television sets are almost as commonplace in homes as are television sets.

Devices which combine the features of a portable unit of a cordless telephone and a remote control unit for a television set are currently available. One example of such a device is described in U.S. Pat. No. 4,508,935. This patent describes a portable unit of a cordless telephone which includes a remote control function by which various electrical responsive devices can be regulated without tying up the subscriber's telephone lines.

Although both the control of a remotely operated device and wireless telephone communications are currently available in a single portable unit, these operations are considered disparate and thus not interrelated in portable units available in the art today.

SUMMARY OF THE INVENTION

In accordance with the invention, an interactive communication system includes a portable unit of a cordless telephone for providing wireless telephone communications and integrating telephone functions and control of remotely operated devices. The portable unit advantageously combines controlling the information provided by a remotely operated device in response to voice and data communications occurring over the telephone network.

In accordance with a first aspect of the invention, responsive to receipt of incoming data from the telephone network, an indication of the origin of the incoming data is provided on a remotely operated device within the interactive communication system.

In accordance with a second aspect of the invention, responsive to communications being established in the portable unit with either a base unit of the cordless telephone or a party at a remote location over the telephone network, the configuration of a remotely operated device within the interactive communication system is altered.

BRIEF DESCRIPTION OF THE DRAWING

The invention and its mode of operation will be more clearly understood from the following detailed description when read with the appended drawing in which.

Throughout the drawing, the same element when shown in more that one figure is designated by the same reference numeral.

DETAILED DESCRIPTION

Figure 1:
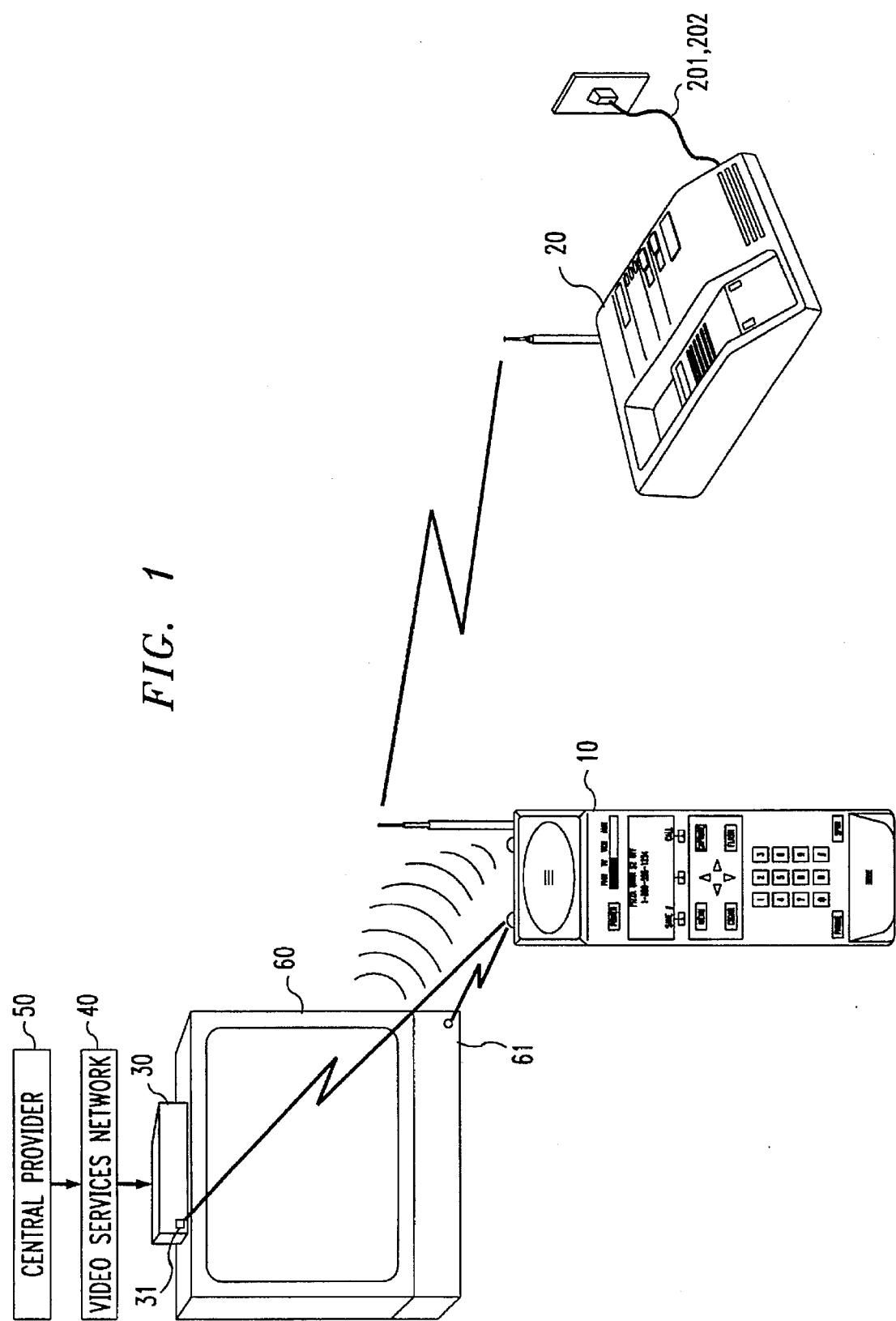
FIG. 1 illustrates an interactive communication system implemented in accordance with the present invention.

Referring now to FIG. 1, there is shown, in accordance with the disclosed embodiment, a cordless telephone portable unit or handset unit 10 which provides normal wireless communications with a cordless telephone base unit 20 and also provides two-way remote control functions for interacting with a plurality of remotely operated devices. For example, the handset unit 10 functions as a capture device for receiving subliminal luminance data from a screen of a video receiving device 60 and also provides the remote control functions for this video receiving device as well as a set-top box 30 associated with the receiving device. Such operation is described in a copending application entitled *System and Method for Wireless Capture of Encoded Data Transmitted with a Television, Video or Audio Signal and Subsequent Initiation of a Transaction Using Such Data,* Ser. No. 08/339,538, filed on Nov. 15, 1994 on behalf of August, Caldwell, Herbst and Sizer and assigned to the same assignee as the present invention.

The video receiving device may be a television, personal computer, work station, broadcast receiving system, or other type of device for displaying video signals. The set-top box 30 may be an appropriately modified game playing device, video cassette recorder, cable television converter or interface, computer network interface or satellite television receiver. Cable converters suitable for use as set-top box 30 are readily available commercially. Some manufacturers are: Panasonic, Stargate, Scientific Atlanta, Jerrold, Tocom, Oak and Zenith, for example.

Integration of the control functions into one common device advantageously allows for interaction of desirable activities automatically. By way of example, when a ringing signal representative .of an incoming telephone call is received over a tip-ring line 201, 202 to which the base unit 20 is connected, an audio signal emanating from the video receiving device 60 or other devices can be automatically muted or reduced to a selectable level when the user goes off-hook in answering the telephone. Specifically, when the base unit 20 receives the ringing signal from the tip-ring line 201, 202, the base unit 20 sends the ringing signal to the handset unit in a conventional manner via a radio frequency (RF) link. The user of the handset unit then presses a phone button on the handset unit 10 to answer the call. The handset unit, in turn, sends via an infrared link an audio mute (or volume reduction) signal to a remotely operated device then in active use, for example, the video receiving device 60. The infrared link between the handset unit 10 and the video display device 60 may be from an infrared transmitter on the handset unit to an infrared detector 61 on the video display device 60. Once muted or reduced in volume level, the remotely operated device remains in this state as long as the telephone is off-hook or until the user takes some action to manually restore the audio signal to its normal volume level. When a user also presses the phone button on the handset unit 10 to place a call, the audio signal from the video receiving device is similarly muted or reduced to the selected level.

Also shown in FIG. 1 are a video service network 40 and a central provider 50. The central provider of video services may be a broadcast TV station, cable television headend, satellite earth station, closed-circuit video theater, computer network, or any other video system or device for transmitting a video program to the display device 60 over the network 40. The network 40 may be an over-the-air, satellite or cable broadcast, or switched video network. The video signals may be broadcast in either digital or analog form.

Present day service providers and advertisers deliver high-quality visual information for encouraging viewers to respond to advertisers via voice or data over the telephone network. For example, now an advertiser selects a broadcast channel to advertise a product and entice a viewer to write down a telephone number and later make a call to respond to the advertisement. The handset unit 10 allows the viewer to capture the telephone number of the advertiser and respond easily with a single button press, and due to the handset unit's unique method of storing data and combining data and voice calls, the advertiser gains information previously unavailable and useful for statistical purposes.

Such information as the time of day and channel from which the viewer received the information, the delay from the onset of the advertisement to the time that the viewer decided to capture the telephone number, and even the viewer's demographic information may be provided. The advertiser is then able to use this information and more knowledgeably select advertising alternatives (for example, which channel or what time of day is most effective in gaining viewer responses). The service provider can also use this information as a way to effectively market the broadcast capabilities to reach target markets. The viewer becomes able to capture and make use of "electronic coupons" as an incentive to respond to advertisements, which is also a benefit to the service provider and the advertiser. Unlike existing interactive television content, information can be embedded in advertisements or visual information inexpensively and without burdening the non-user of this technology.

Traditionally, the advertiser has had to provide telephone support staff to handle orders. The handset unit allows detailed order information to be entered by the user off line. This order information can be delivered to the advertiser via an integrated modem, automating the ordering process and reducing associated costs. Also, if an order is attempted during a time when there is a high volume of calls, the handset unit can automatically redial the advertiser's number until the connection is successfully made, further increasing the likelihood of order completion.

Due to the ease of responding to advertisements and other information, viewers are likely to respond sooner and in greater numbers, thus making more use of the existing long distance telephone routing network. This reduces the necessity for viewers to remember telephone numbers and reduces the burden on advertisers to select telephone numbers which they feel are easy to remember. This is accomplished since the burden of remembering the numbers is allocated to the handset unit, which advantageously stores the numbers in memory for the viewer.

The handset unit 10 includes a user interface portion which facilitates ease of use for the user, this interface portion being discussed in detail later herein with reference to FIG. 3. A user of the handset unit 10 can set the portable unit to automatically capture all incoming information such that the information appears on the handset display whenever it is transmitted. For example, there are some television programs in which advertisers of a particular type or series of products will more likely be found. Thus, the user may be interested in capturing all of the advertiser's information provided during these programs for later use.

The user also can set the handset unit 10 to capture data only in response to a specific key press. For example, the user can press a capture button in response to a visual or audible symbol momentarily appearing on the television screen which causes the information being received by the handset unit 10 to be displayed on the display of the handset unit 10. The user can then either act on this information or save it for later use as desired.

Handset controls are independently mapped for state dependent functions. Operational modes include, for example, telephone, television, video cassette recorder, and an auxiliary mode. A user specifies the mode of control for the handset unit using a position selectable hard switch. LCD based soft keys provide dynamic mapping of existing controls across operational modes. Hard keys are also dynamically mapped across operational modes. Available controls allow for on-screen cursor positioning and menu navigation, for example. The handset unit is capable of collecting program commands as well as previously described information and may carry out commands in a manner described by the collected program rather than its preprogrammed response.

Figure 2:
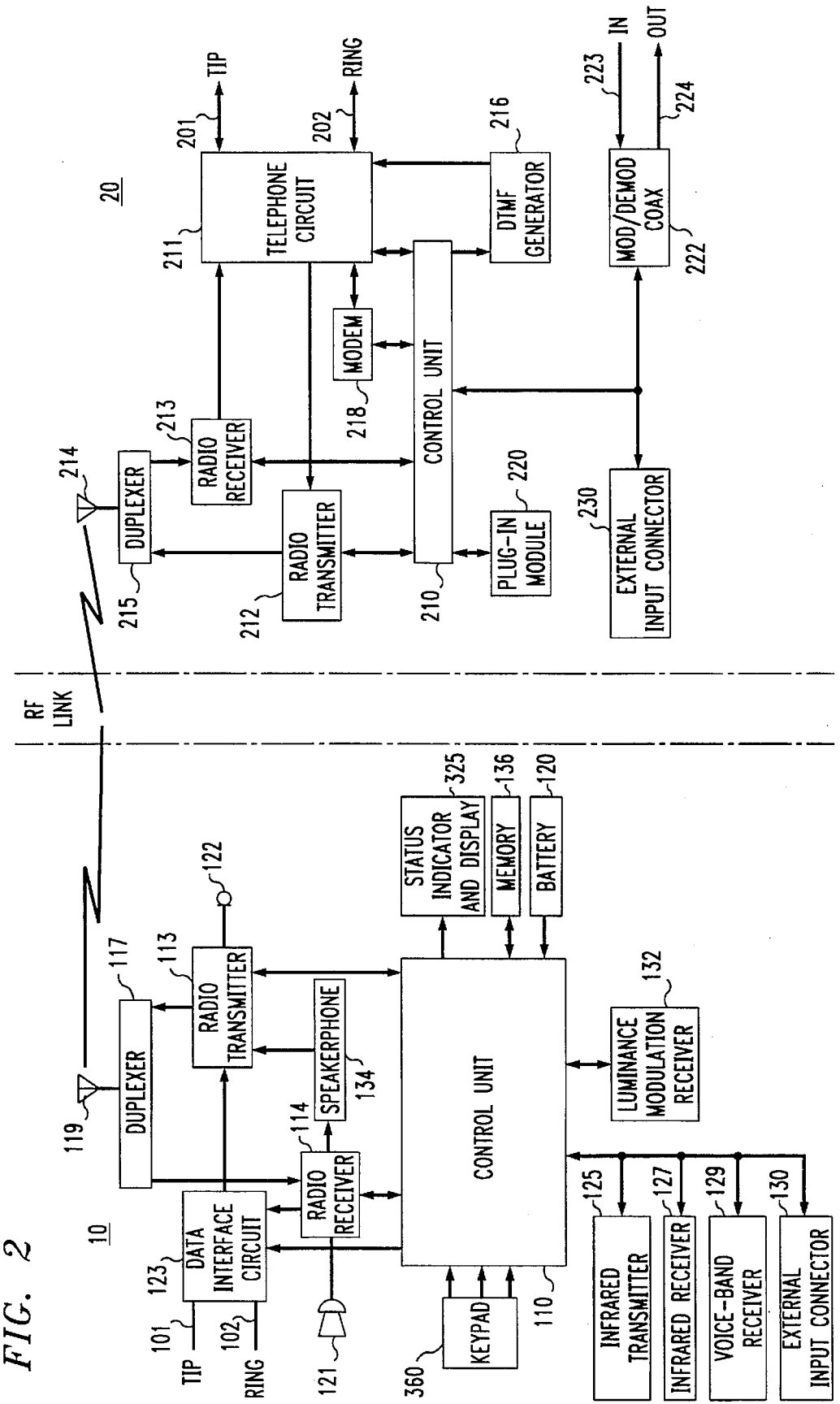
FIG. 2 is a functional block representation of a cordless telephone base unit and portable unit both operative in the interactive communication systems described herein, in accordance with the present invention.
Figure 5:
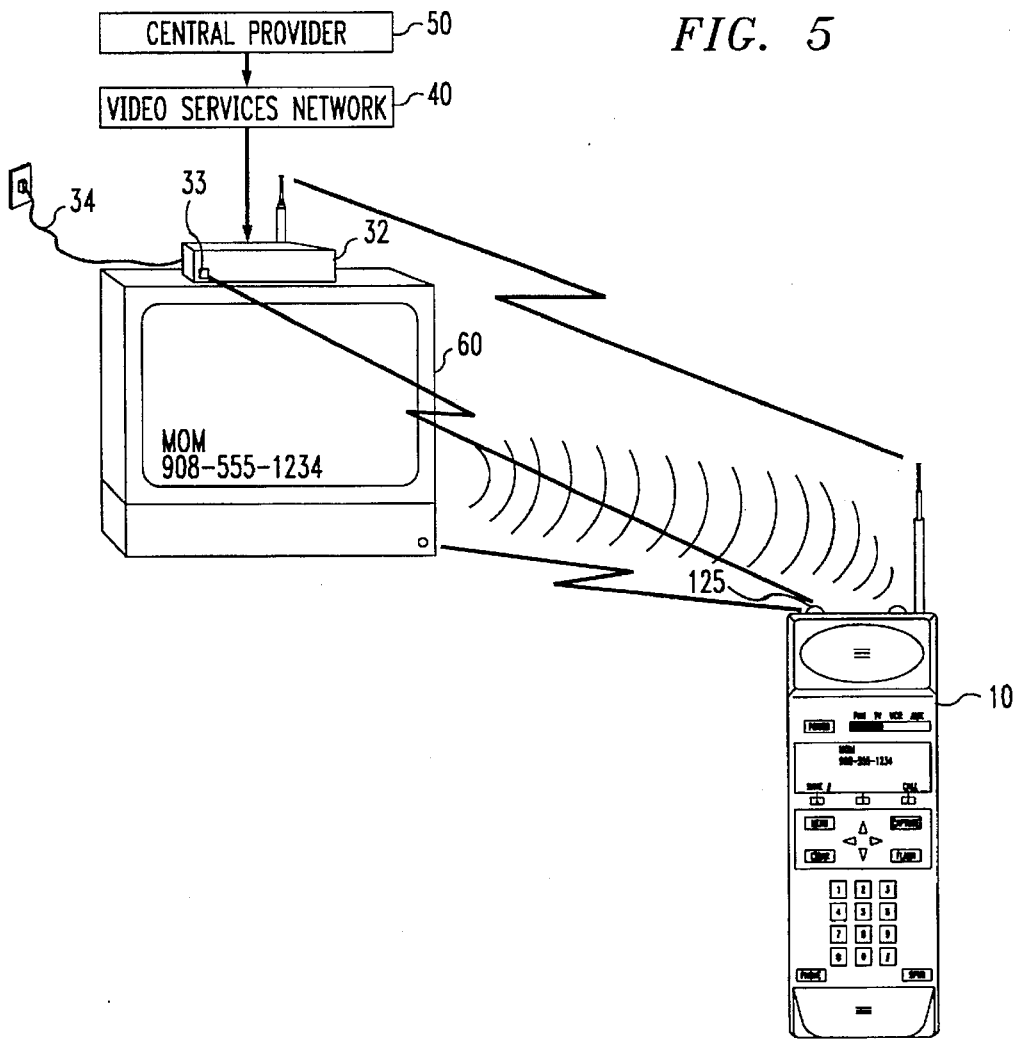
FIG. 5 illustrates an interactive communication system implemented in accordance with the the present invention.

Referring next to FIG. 2, there is shown a functional block representation of the handset unit 10 and the base unit 20 employed in an interactive communication system operative in accordance with the principles of the invention. As shown, the interactive communication system generally comprises the handset unit 10 and at least one base unit 20. It is to be understood that the handset unit 10 may communicate with more than one base unit or base-unit-like device over its RF link. For example, multiple base units may be suitably configured for operation with the handset unit, or other remotely operated devices may have the telephone functionality of a base unit incorporated therein for operation with the handset unit. For example, a set-top box, as described later herein with reference to FIG. 5, is configured to have the functionality of the base unit 20 incorporated therein.

Included in the handset unit 10 is a control unit 110 which advantageously provides a number of control functions. This control unit 110 may be implemented through the use of a microcomputer containing read-only-memory (ROM), random-access-memory (RAM) and through use of the proper coding. Such a microcomputer is known in the art and is readily available from semiconductor manufacturers such as Fujitsu, Motorola and NEC.

The control unit 110 generates an identification code that is transmitted from the handset unit 10 to the base unit 20 while establishing initial communications as well as during the transfer of subsequent opcode data to the base unit. This control unit 110 also configures a radio frequency (RF) transmitter 113 and an RF receiver 114 for operation on one of the plurality of predetermined frequency channels for communicating with a selected one of the plurality of base units operating on the frequency channel. The transmitter 113 and the receiver 114 respectively transmits signals to and receives signals from the base unit 20 with the control unit 110 providing the appropriate frequency channel control information to both units. The transmit and receive signals of the handset unit 10 are coupled to a duplexer 117 which permits the transmitter 113 and the receiver 114 to both simultaneously operate over antenna 119 while preventing the output of transmitter 113 from being coupled directly to the input of the receiver 114. The receiver 114 also demodulates voice signals transmitted by the base unit 20 and couples these signals to a loudspeaker 121. The transmitter 113 has as its input both speech signals from a microphone 122 and data signals from the control unit 110 which it transmits to the base unit 20.

A battery 120 is included in the handset unit 10 and provides operating power for all circuitry in this unit. Also included in the handset unit is a keypad 360, a handset unit status indicator and display 325, and a data interface circuit 123. The keypad 360 is used for entering dial digits or control functions executed by the control unit 110 in the handset unit.

The handset unit status indicator and display 325 displays incoming information received by the handset unit 10 from an audible or visual display provided by a remotely operated device, and provides menu selections to the user when the incoming information consists of conditional functionality, i.e., the user must take some intermediate action in response to the data received to ultimately provide a proper response. Although a visual display is shown on the handset unit 10, typically an ICON or other information may be momentarily indicated on the screen of the video receiving device to inform a user of the handset unit whenever information is available to be captured by the handset unit 10.

The handset unit status indicator and display 325 contains, by way of example, a liquid crystal display (LCD) suitably arranged for providing desired status indications. This status indicator and display 325 is connected to the control unit 110 and is used for standard cordless telephone programming and memory allocation. For example, this display provides an indication to the user of the handset unit when a communications link has been established between the handset unit 10 and the base unit 20. A battery status indication reflective of the charge on the battery 120 is also provided by this status indicator and display 325.

The data interface circuit 123 contains a hybrid and associated circuitry for providing a suitable port on tip-ring lines 101 and 102 for an external modem or data communications equipment device.

Also shown in the handset unit 10 of FIG. 2 are an infrared transmitter 125, an infrared receiver 127, a voice band receiver 129, and an external input connector device 130. The infrared transmitter 125 and infrared receiver 127 are used for respectively transmitting and receiving infrared signals to and from other infrared controlled devices. For example, the handset unit 10 may transmit an infrared signal to a video cassette recorder, commanding it to pause. The user is able to program the handset unit by receiving infrared signals from another remotely operated device and assigning the received signal a particular function, thus being able to duplicate the same infrared signal and transmit it to another device.

The voiceband receiver 129 receives audio signals (outside of human perception range) as disclosed in a copending application entitled *System and Method for Wireless Capture of Encoded Data Transmitted with a Television, Video or Audio Signal and Subsequent Initiation of a Transaction Using Such Data*, this application being referenced earlier herein. Enclosed in these audio signals are data that includes, for example, a telephone number or a program that includes conditional branching and presentations. The status indicator and display 325 displays this incoming information and provides menu selections to the user when the incoming information consists of conditional functionality.

The external input connector 130 enables the user of the handset unit 10 to connect one of several input devices (for example, a full-sized keyboard, a miniature keyboard, a mouse, a track ball, a joystick, etc.).

The luminance modulation receiver 132 includes an optical device which receives information from a standard television screen as described, for example, in U.S. Pat. No. 4,807,031. The information from the luminance modulation receiver 132 is coupled to the control unit 110 which stores the information in "short-term memory" if the handset unit is configured in an automatic capture mode or simply holds the information in "long-term memory" such as memory 36 for later display at the user's leisure.

Although the above components, the infrared transmitter 125, the infrared receiver 127, the voice-band receiver 129 and the luminance modulation receiver 132 are shown as being in the handset unit 10, it is understood and anticipated that one skilled in the art would realize that these units may also be incorporated into the base unit 20 and suitable performance achieved thereby. Thus, such a configuration and the operation achieved therefrom is anticipated.

Referring next to base unit 20, there is shown a control unit 210 which interfaces with control unit 110 in the handset unit 10 for receiving the appropriate identification code data and for establishing a two-way communications link between the handset unit and the base unit. This control unit 210 also receives and processes opcode data provided by the handset unit 10 in dialing and providing tone signaling information out to a central office via telephone circuit 211 and tip-ring lines 201 and 202.

The control unit 210 stores in memory located therein the appropriate identification code provided by the control unit 110 contained in the handset unit 10 and transmits this code via FSK signals back to the control unit 110. Communications with the handset unit 10 are provided via transmitter 212 and receiver 213 in the base unit 20. The output of the transmitter 212 and input for the receiver 213 is coupled to an antenna 214 through a duplexer 215.

The telephone circuit 211 serves as a plain old telephone service (POTS) interface for signals on the tip-ring lines and those received by receiver 213 and those transmitted by transmitter 212. Responsive to the control unit 210, a dual-tone-multiple-frequency generator 216 provides the frequency tones to the telephone circuit 211.

Also shown as part of the base unit 20 is a modulator/demodulator coaxial circuit 222, a plug-in module 220, a modem 218 and an external input connector device 230. The modulator/demodulator coaxial circuit receives a signal from, for example, a video services network 40 over line 223 and provides this signal to a video receiving device such as display device 12 over line 224. The modulator/demodulator coaxial circuit 222 allows for a pass-through signal in standard normal operations and provides for advanced control such as, for example, the generation of on-screen information when programmed for specific operations. The plug-in module 220 accepts ROM cartridges which contain specific control data for controlling the modulator/demodulator coaxial circuit 222 and also for providing the programs for the generation of on-screen information and other control operations within the base unit 20. The modem 218 allows binary data to be accepted from or passed through to the telephone circuit 211 and also may be programmed to automatically make binary connections to a destination telephone number during periods of low-volume telephone traffic, such as is the case during the late night and early morning hours. The external input connector 230 enables the user of the base unit 20 to connect one of several input devices (for example, a full-sized keyboard, a miniature keyboard, a mouse, a track ball, a joystick, etc.).

Figure 3:
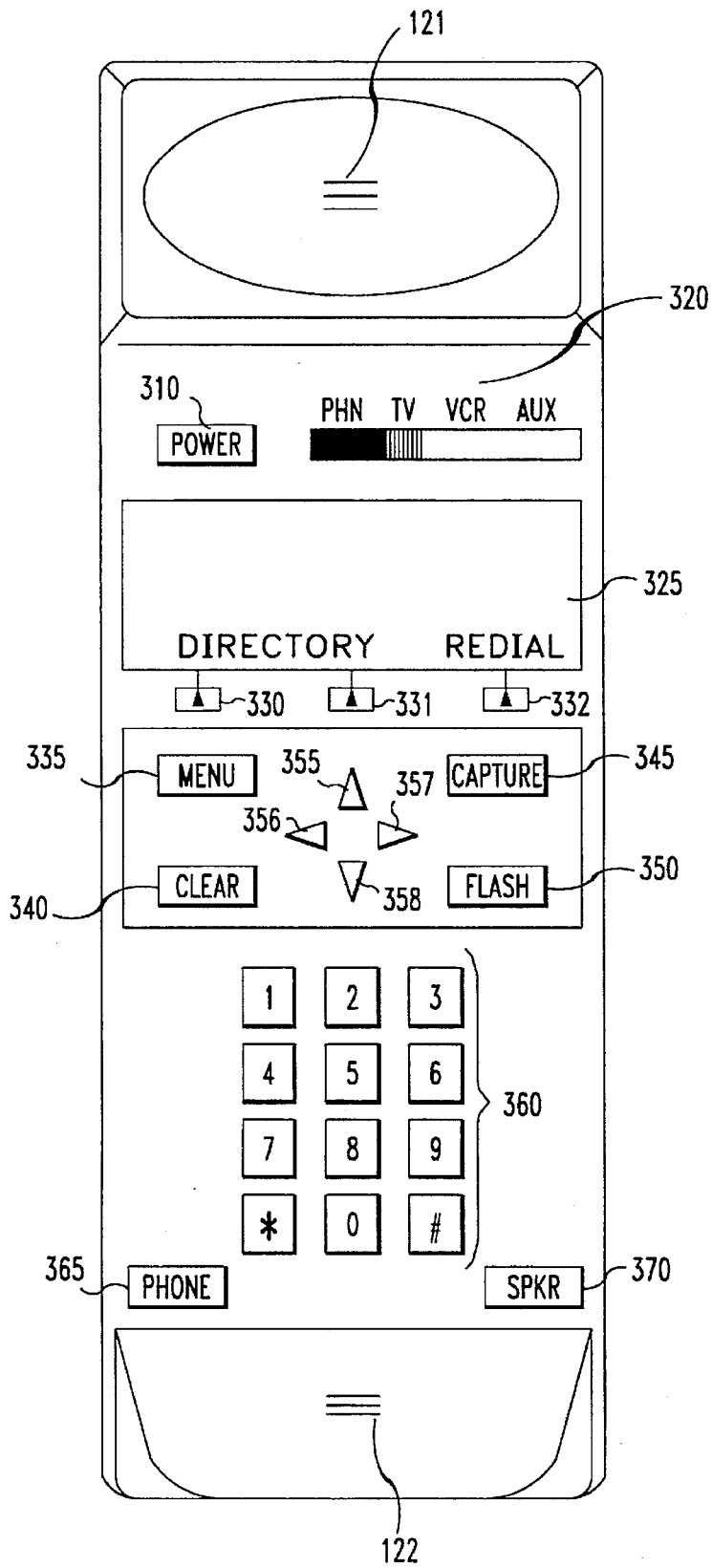
FIG. 3 illustrates a portable unit including a user interface portion operative in the interactive communication systems described herein, and accessible in accordance with the present invention.

Referring next to FIG. 3, there is shown in greater detail the user interface portion of the handset unit 10. The handset unit interface portion includes a power button 310, a switchable mode switch 320, the status indicator and display 325, soft keys 330 through 332, a menu key 335, a clear key 340, a capture key 345, a flash key 350, arrow keys 355 through 358, the keypad 360, a phone button 365, and a speaker button 370.

The position of the operational mode switch 320 determines the functionality of handset controls provided in the user interface portion of the handset unit. Four mode positions, telephone (PHN), television (TV), video cassette recorder (VCR) and auxiliary (AUX) are illustratively shown and are selectable by a user of the handset unit. It is to be understood that this number of selectable options is not intended to be considered as limiting, but rather is simply provided to show a variety of selectable remotely operated devices with which the handset unit 10 may communicate.

When the mode switch 320 is in the phone (PEN) position, the power button 310 is used to go on-hook and off-hook at the handset unit by a user in a conventional manner for respectively accessing dial tone and hanging up the telephone. Providing the on-hook and off-hook operation at this power button while the mode switch is in the phone position facilitates quick ease of use and simplicity for a novice user of the handset unit. The phone button 365 is a dedicated button and also provides a means for a user to go on-hook and off-hook at the handset unit for respectively accessing dial tone and hanging up the telephone. The difference between the two buttons 310 and 365 is that the latter button is actuatable for going on-hook or off-hook irrespective of the position of the mode switch 320. Thus, if an incoming call is received at the handset unit 20 while the mode switch 320 is in a position other than the phone position, and the user of the handset unit wishes to answer the call, he or she simply presses the phone button 365 and the handset unit goes off-hook allowing the user to converse with the calling party.

While the mode switch 320 is in the phone position, soft keys 330 through 332 are used to access telephone features. These features vary depending on the selected position of the switch 320. Examples of soft key labels appearing in the display 325 while the switch 320 is in the phone position include directory, redial, mute and hold. The menu key 335 is used for accessing telephone features. The arrow keys 355 through 358 are used for navigating through telephone features such as, by way of example, scrolling through a directory of stored numbers. The keypad 360 is used to enter telephone number digits during dialing and programming of a repertory dialer memory, for example. The speaker button 370 is a dedicated button used to activate speakerphone circuitry 134 (FIG. 1) in the handset unit while the handset unit is being used for communicating with the base unit during, for example, a telephone conversation.

When the operational mode switch 320 is in the television position and properly programmed with a correct signal code, the power button 310 turns a television set on and off. Also while the mode switch 320 is in this television position, the soft keys 330 through 332 are used to access television features. Examples of soft key labels while the mode switch is in the television position include mute, flashback and sleep. Similar to the soft keys, the menu key 335 is also used to access television features while the mode switch is in the television position. The up and down arrow keys 355 and 358 are used to adjust television volume. And the left and right arrow keys 356 and 357 are used to respectively decrement or increment the selected and displayed television channel. The keys on the keypad 360 are used to enter a desired channel number.

When the operational mode switch 320 is in the VCR position and properly programmed with the correct signal code, the power button 310 is used for turning a VCR on and off. Soft keys 330 through 332 are similarly reassigned to VCR features. Examples of such features include stop, play and record. When the mode switch 320 is in the VCR position, the menu key 335 also is used to access VCR features. While the mode switch 320 is in this VCR position, the up and down arrow keys are used to navigate through VCR feature menus. The left and right arrow keys 356 and 357 are used to respectively rewind and fast forward the VCR. The keypad 360 is used to facilitate VCR programming by selecting times for recording, including setting the time of day and day of the week as well as other selectable features.

The auxiliary mode selectable by the operational mode switch 320 can be programmed by the user to control another infrared controlled device such as an appropriately modified game playing device, cable television converter or interface, computer network interface or satellite television receiver, by way of illustrative example. The power switch 310, soft keys 330 through 332, arrow keys 355 through 358, and the other labeled keys are programmable to interact with and access the features of a selected auxiliary device.

Like the phone button 365 and speaker button 370, the clear button 340, capture button 345 and the flash button 350 also are dedicated buttons. They therefore operate in the same manner regardless of the position of the operational mode switch 320. The clear button removes any existing data from the display screen 325 on the handset unit. The capture button 345 allows the handset unit to receive and store luminance data displayed on a television screen or in a high-frequency audio signal. The flash button 350 sends a timed switchhook flash to a central office (not shown) via the base unit 20 and the tip-ring line 201, 202 shown in FIGS. 1 and 2.

Figure 4:
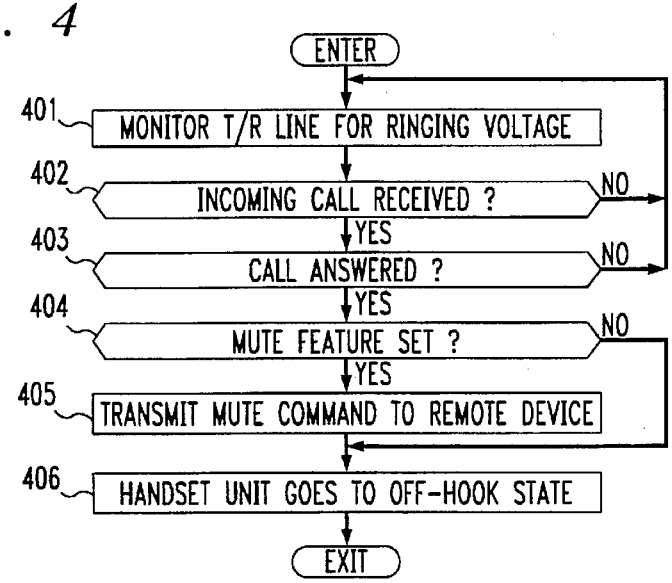
FIG. 4 shows in flow chart form a protocol implemented in the interactive communication system which depicts the specific processes executed by both the cordless telephone base unit and portable unit and also a remotely operated device in integrating telephone functions and control of remotely operated devices, in accordance with the present invention.

With reference next to FIG. 4, there is shown a flow chart illustrating the operation of the interactive communication system wherein information received from the telephone network is used for controlling a remotely operated device. The functions performed by control units 110 and 210 shown in FIG. 2 are advantageously determined by a process or program contained in the respective memories of these control units.

The process is entered at step 401 wherein the tip-ring line is monitored for the receipt of ringing voltage. From step 401, the process advances to decision 402 where a determination is made as to whether an incoming call has been received. If not, the process returns to step 401. If an incoming call has been received, the process advances to step 403 where it is determined if the call has been answered by a user going off-hook at the handset unit 10. If the call has not been answered, the process returns to step 401 and continues to monitor the tip-ring line for receipt of ringing voltage.

If the call has been answered in step 403, the process advances to decision 404 where a determination is made as to whether the mute feature is set. The mute feature includes not only totally muting the sound emanating from the remotely operated device but also setting the sound at some reduced predetermined level selected by the user of the telephone. Thus, if the mute feature is set, the process advances to step 405 where the mute command is transmitted from the handset unit to the remotely operated device then in use. From step 405, the process advances to step 406 where the handset unit is placed in the off-hook state and the user converses with the called party. If the mute feature is not set, however, no mute command is transmitted to the remotely operated device, and from decision 404 the process advances directly to the step 406. From step 406, the routine is exited.

The foregoing describes one embodiment of an interactive communication system that incorporates the principles of the present invention. Various modifications can be made to this basic communication system, however, to provide many different types of operations. One such modification is the interactive communication system shown in FIG. 5. In this system embodiment, the features and functions of the cordless telephone base unit are incorporated into a set-top box 32 which connects to a central office (not shown) through a tip-ring line 34. The handset unit 10 thus provides cordless telephone communications for a user through the set-top box 32.

The same basic components of the base unit 20 described in FIG. 2 are used in implementing the base unit-like circuitry contained in the set-top box 32. Because of this and the detailed description given the base unit embodiment in FIG. 2, this embodiment will be described in similar detail only where the operation of the component sections differ and sufficient clarity of operation might not be readily apparent from the description provided in that embodiment. Also, circuitry contained in the set-top box 32 may include the circuitry and interfaces associated with the handset unit 10 in FIG. 2 and thus provide the same features and functions available from this handset unit.

Referring next to FIG. 5, there is shown, in accordance with the disclosed embodiment, the cordless telephone portable unit or handset unit 10 which provides normal wireless communications with a cordless telephone base unit contained in the set-top box 32. Also shown in FIG. 5 are the video service network 40 and the central provider 50. The video signals from the central provider and through the video services network may be broadcast in either digital or analog form.

In a copending application entitled *System and Method of Capturing Encoded Data Transmitted Over a Communications Network in a Video System* filed on behalf of Isenberg and Tuomenoksa on Mar. 18, 1994, Ser. No. 08/210,802 and assigned to the same assignee as the present application, it has been recognized that non-perceptible information can be encoded in a television program, captured in a set-top box and thereafter used to make telephone calls. The set-top box disclosed in this application is an electrical device that is hard-wired into the circuit between the video services network and the video receiving device as a stand-alone unit or, alternatively, as part of the video receiving device itself. This copending application is incorporated herein by reference.

The handset unit 10 provides two-way remote control functions for interacting with other remotely operated devices. For example, the handset unit 10 functions as a capture device for receiving subliminal luminance data from a screen of the video receiving device 60 and also provides the remote control functions for this video receiving device as well as the set-top box 32. The set-top box 32 may be an appropriately modified cable converter box presently commercially available from a number of suppliers of such converters. For example, converter Model 8590-757 from Scientific Atlanta, converter Model DPBB from Jerrold and converter Model 5503 VIP from Tocom are all set-top boxes presently available with the functionality for providing the desired converter box features.

Integration of the control functions into one common device advantageously allows for interaction of desirable activities automatically. By way of example, when a ringing signal representative of an incoming telephone call is received over the tip-ring line 34 to which the set-top box 32 is connected, the set-top box is able to display on the video receiving device 60 a video message which provides the identity of the calling party. Such operation is achieved by incorporating the teaching of U.S. Pat. No. 4,277,649 issued to D. Sheinbein on Jul. 7, 1981 into the set-top box 32. This patent discloses circuitry which provides for capturing the identity of the calling party's line and is incorporated herein by reference. Thus, the number of the calling party may be displayed in a captioned manner on the video receiving device 60 and/or the display 325 of the handset unit 10 while the telephone is ringing, thereby permitting call screening for a user. Alternatively, a user may program the call screening circuitry of the set-top box 32 such that a name or other identifying information is automatically associated with the identified incoming calling party's line, and this name or related information is displayed in captioned form on the video receiving device and/or the display along with or in place of the telephone number. Still further, a user may easily program the operation of the set-top box 32 so that upon receipt of the incoming ringing signal from the telephone network, the set-top box attenuates the sound being generated by the remotely operated device, to assist the user in hearing the incoming ringing signal.

Another desirable activity available as a result of integration of the control functions into one common device is the ability for a user to remotely access his or her set-top box for altering the configuration of this device. For example, a user might want to limit the programs that the set-top box is capable of receiving from a video service network 40 at any given time and accesses the set-top box 32 from the handset unit 10. By entering predetermined codes at the handset unit 10, the user is able to remotely program the set-top box 32 and thus enable a first set of channels or signals to reach the attached video receiving device 60 and a second set of channels or signals from reaching the video receiving device 60.

This same function may also be provided for a user who is located remote from his or her residence. For this operation the user calls his or her telephone number and accesses the set-top box 32 for configuring this unit as desired. By entering the predetermined codes, the user is again able to enable or inhibit certain channels or signals from reaching video receiving device 60.

Once a user answers the telephone at the handset unit, the set-top box 32 either mutes an audio signal emanating from a remotely operated device such as the video receiving device 60 or reduces the audio signal to a preselected level. Thus, in operation, when the set-top box 32 receives a ringing signal from the tip-ting line 34, the set-top box 32 sends the ringing signal to the handset unit 10 in a conventional manner via a radio frequency (RF) link. The user of the handset unit 10 then presses the phone button on the handset unit 10 to answer the call. The handset unit, in turn, sends via an infrared link the audio mute (or volume reduction) signal back to the set-top box for adjusting the volume as desired by the user. The infrared link between the handset unit 10 and the set-top box 32 may be between the infrared transmitter 125 on the handset unit and an infrared detector 33 on the set-top box 32. Once muted or reduced in volume level, the remotely operated device remains in this state as long as the telephone is off-hook or until the user takes some action to manually restore the audio signal to its normal volume level.

In an alternative operation of the interactive communication system in muting or attenuating the volume of the remotely operated device, once the user of the handset unit 10 presses the phone button on the handset unit 10 to answer the call, this information is communicated to the set-top box 32 from the handset unit via the RF link then existing between the handset unit 10 and the set-top box 32 or even directly detected by circuitry in the set-top box. The remotely operated device remains in the muted or reduced volume state until the user goes on-hook or restores the audio signal to its normal volume level.

Figure 6:
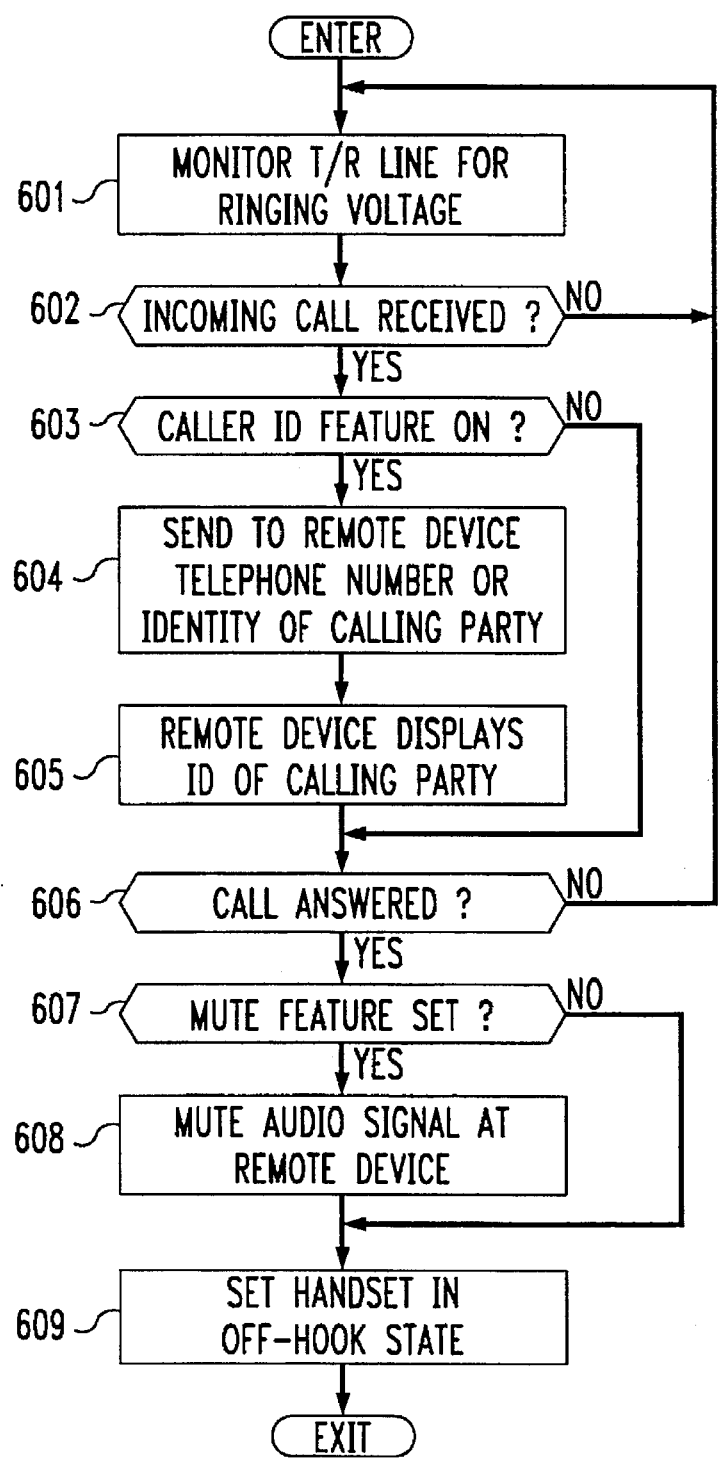
FIG. 6 shows in flow chart form a protocol implemented in the interactive communication system which depicts the specific processes executed by the cordless telephone portable unit and also a remotely operated device containing the functionality of a telephone base unit in integrating telephone functions and control of remotely operated devices, in accordance with the present invention.

With reference next to FIG. 6, there is shown a flow chart illustrating the operation of the interactive communication system wherein information received from the telephone network is used for controlling a remotely operated device. The functions performed by control units 110 and 210 shown in FIG. 2 are advantageously determined by a process or program contained in the respective memories of these control units.

The process is entered at step 601 wherein the tip-ring line is monitored for the receipt of ringing voltage. From step 601, the process advances to decision 602 where a determination is made as to whether an incoming call has been received. If not, the process returns to step 601. If an incoming call has been received, the process advances to decision 603 where a determination is made as to whether the caller ID feature is activated in the telephone portion of the set-top box unit.

If the caller ID feature is activated, the process advances to step 604 where the set-top box sends to the remotely operated device the telephone number or identity of the calling party. From step 604, the process advances to step 605 where the remotely operated device displays the ID of the calling party and/or information which identifies the calling party. From step 605, the process advances to decision 606.

If the caller ID feature is not activated as determined in step 603, the process advances directly to decision 606. At decision 606, a determination is made as to whether the call has been answered by detecting if a user has gone off-hook at the handset unit 10. If the call has not been answered, the process returns to step 601 and monitors the tip-ring line for receipt of ringing voltage. If the call has been answered in step 606, the process advances to step 607 where a determination is made as to whether the mute feature is set. If the mute feature is set, the process advances to step 608 where the sound from the remotely operated device then in use is either muted or reduced in volume. From step 608, the process advances to step 609 where the handset unit is placed in the off-hook state and the user converses with the called party. If the mute feature is not set, however, the sound emanating from the remotely operated device is not muted, and from decision 607 the process advances directly to the step 609. From step 609, the routine is exited.

Although this invention has been specifically described with reference to a cordless telephone, it is to be understood that other wireless telephones may similarly be configured for providing the same inventive functions and features of the interactive communication system described above herein. By way of example, a cellular telephone may be configured to provide the functionality described in the above disclosed embodiments.

We claim:

1. In a cordless telephone, a handset unit for communicating with a base unit connectable to a telephone line, the handset unit communicating with the base unit over a telecommunication channel and comprising:

means for establishing communications with said base unit for two-way transmission of voice and data over the telecommunication channel;

means for communicating with a remotely operated television set for receiving subliminal luminance data from a screen of said television set and for controlling the configuration of said television set; and means responsive to receipt of an incoming signal from said base unit for modifying an audio signal emanating from said remotely operated television set by a predetermined amount.

2. The cordless telephone as in claim 1 wherein said handset unit further includes memory means for storing said subliminal luminance data.

3. The cordless telephone as in claim 1 wherein said incoming signal from said base unit is a ringing signal.

4. The cordless telephone as in claim 3 wherein said modifying means further includes means for displaying both on said remotely operated television set and on a display in said handset unit an indication of the origin of said incoming signal.

5. The cordless telephone as in claim 3 wherein said modifying means includes means for reducing said audio signal emanating from said remotely operated television set by said predetermined amount responsive to receipt of said incoming signal.

6. The cordless telephone as in claim 4 wherein said displaying means further includes means for displaying a telephone number associated with a calling party.

7. The cordless telephone as in claim 6 wherein said displaying means further includes means for associating identifying information for display with the telephone number of the calling party.

8. In a cordless telephone, a handset unit for communicating over a telecommunication channel with a base unit connectable to a telephone line, the handset unit comprising:

means for establishing communications with said base unit for two-way transmission of voice and data over the telecommunication channel;

means for communicating with both a first and a second remotely operated device for controlling the configuration of said devices; and means for altering the configuration of said remotely operated devices in response to the handset unit establishing communications with said base unit, said altering means including means for configuring said first remotely operated device for selectively coupling a first set of identified signals to said second remotely operated device and inhibiting a second set of identified signals from reaching said second remotely operated device, said second remotely operated device being attached to said first remotely operated device.

9. The cordless telephone as in claim 8 wherein said first remotely operated device is a set-top box.

10. The cordless telephone as in claim 8 wherein said altering means includes means for reducing an audio signal emanating from said second remotely operated device by a predetermined amount.

11. The cordless telephone as in claim 10 wherein said second remotely operated device is a television set.

12. The cordless telephone as in claim 8 wherein said altering means includes means for muting an audio signal emanating from said second remotely operated device.

13. The cordless telephone as in claim 12 wherein said second remotely operated device is a high-fidelity stereophonic system.

14. The cordless telephone as in claim 12 wherein said second remotely operated device is a video cassette recorder.

15. A method of communicating with a handset unit in a cordless telephone, the handset unit communicating over a telecommunication channel with a base unit connectable to a telephone line, the method comprising the steps of:

establishing communications with said base unit for two-way transmission of voice and data over the telecommunication channel;

communicating with a remotely operated television set for receiving subliminal luminance data from a screen of said television set and for controlling the configuration of said television set; and modifying an audio signal emanating from said remotely operated television set by a predetermined amount upon receipt of an incoming signal from said base unit.

16. The method of claim 15 wherein said modifying step includes the step of muting an audio signal on said remotely operated television set.

17. The method of claim 15 wherein said incoming signal from said base unit is a ringing signal.

18. The method of claim 17 further including the step of displaying on both said remotely operated television set and on a display in said handset unit an indication of the origin of the incoming signal upon receipt of said incoming signal from said base unit.

19. The method of claim 18 wherein said displaying step further includes the step of displaying a telephone number associated with a calling party.

20. The method of claim 19 wherein said displaying step further includes the step of associating identifying information for display with the telephone number of the calling party.

21. A method of communicating with a handset unit in a cordless telephone, the handset unit communicating over a telecommunication channel with a base unit connectable to a telephone line, the method comprising the steps of:

establishing communications with said base unit for two-way transmission of voice and data over the telecommunication channel;

communicating with both a first and a second remotely operated device for controlling the configuration of said devices; and altering the configuration of said remotely operated devices responsive to establishing communications with said base unit, said altering step including the step of configuring said first remotely operated device for selectively coupling a first set of identified signals to said second remotely operated device and inhibiting a second set of identified signals from reaching said second remotely operated device, said second remotely operated device being attached to said first remotely operated device.

22. The method of claim 21 wherein said first remotely operated device is a set-top box.

23. The method of claim 21 wherein said altering step includes the step of muting an audio signal emanating from said second remotely operated device.

* * * * *